(12) United States Patent
Richardson et al.

(10) Patent No.: US 9,866,501 B2
(45) Date of Patent: Jan. 9, 2018

(54) VIRTUAL SWITCH ENABLING COMMUNICATION BETWEEN EXTERNAL OBJECTS AND SIMULATION OBJECTS

(71) Applicant: Invensys Systems, Inc., Foxboro, MA (US)

(72) Inventors: Randall Richardson, Lake Forest, CA (US); Llewellyn John Knox-Davies, Rancho Santa Margarita, CA (US); Kevin David Kimber, South Gloucestershire (GB); Leonard Beller, Newport Center, VT (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 238 days.

(21) Appl. No.: 14/587,195

(22) Filed: Dec. 31, 2014

(65) Prior Publication Data

US 2015/0188849 A1  Jul. 2, 2015

Related U.S. Application Data

(60) Provisional application No. 61/922,440, filed on Dec. 31, 2013.

(51) Int. Cl.
*H04L 12/931* (2013.01)
*H04L 12/24* (2006.01)

(52) U.S. Cl.
CPC ............ *H04L 49/70* (2013.01); *H04L 41/145* (2013.01)

(58) Field of Classification Search
None
See application file for complete search history.

(56) References Cited

U.S. PATENT DOCUMENTS

| 2002/0111783 | A1* | 8/2002 | Kodosky | G05B 17/02 703/13 |
| 2005/0232256 | A1* | 10/2005 | White | H04L 12/2697 370/360 |
| 2011/0238820 | A1* | 9/2011 | Matsuoka | G06F 9/5077 709/224 |
| 2012/0320918 | A1* | 12/2012 | Fomin | H04L 12/4625 370/392 |
| 2013/0132607 | A1* | 5/2013 | Sinha | H04L 45/00 709/238 |
| 2013/0151792 | A1* | 6/2013 | Smith | G06F 3/0614 711/147 |
| 2013/0262647 | A1* | 10/2013 | Kurita | G06F 9/54 709/223 |
| 2014/0298335 | A1* | 10/2014 | Regev | G06F 11/261 718/1 |

* cited by examiner

*Primary Examiner* — Charles C Jiang
*Assistant Examiner* — George Atkins, Jr.
(74) *Attorney, Agent, or Firm* — Stephen Manetta; Ralph Graham

(57) ABSTRACT

Enabling communication between real and simulated elements of a process control system. Software instructions stored in a memory device are executed by a processor to represent a virtual switch. The virtual switch connects to a real element of a process control system and to a simulated element of a process control system. The virtual switch receives communication from the real element intended for the simulated element and forwards the communication to the proper simulated element. The virtual switch receives communication from the simulated element intended for the real element and forwards the communication to the proper real element.

20 Claims, 2 Drawing Sheets

VIRTUAL SWITCH ENABLING COMMUNICATION BETWEEN EXTERNAL OBJECTS AND SIMULATION OBJECTS

BACKGROUND

Networked devices in computerized industrial control and automation systems monitor, log, and display relevant manufacturing/production events and associated data. The devices communicate with supervisory level control and manufacturing information systems. Such systems generally execute above a regulatory control layer in a process control system to provide guidance to lower level control elements such as, by way of example, programmable logic controllers or distributed control systems (DCSs). Such systems are also employed to acquire and manage historical information relating to such processes and their associated outputs.

Simulation design tools weigh design implications such as regulatory compliance, profitability, and safety against standard design practices. Such tools should use accurate thermodynamic methods, physical property data, component information, equipment models, and the like to create a design. Similarly, simulation optimization tools determine optimal operating parameters for a process to deliver the targeted operational results while subject to feed, safety, environmental and other constraints. Optimization tools should monitor performance, control, and obtain peak performance.

Integrating simulated devices with real devices is needed to improve modeling and simulation functions that are used to decrease costs and startup times when introducing new hardware to a system retrofitting/upgrading a design environment. Integration of simulation and real devices is also needed for improved analysis and troubleshooting of system response and performance.

SUMMARY

Briefly, aspects of the present invention enable communication between real devices and simulated devices to improve modeling and simulation functions and, thus, allow a user to capture the economic benefit from processes such as refinery, chemical, or petrochemical plant operations.

In one form, a system enables communication between real and simulated elements of a process control system. Software instructions stored in a memory device are executed by a processor to represent a virtual switch. The virtual switch connects to a real element of a process control system and to a simulated element of a process control system. The virtual switch receives communication from the real element intended for the simulated element and forwards the communication to the proper simulated element. The virtual switch receives communication from the simulated element intended for the real element and forwards the communication to the proper real element.

In another form, software instructions are stored on one or more tangible, non-transitory computer-readable media and are executed by a processor. In another form, a processor executable method is provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
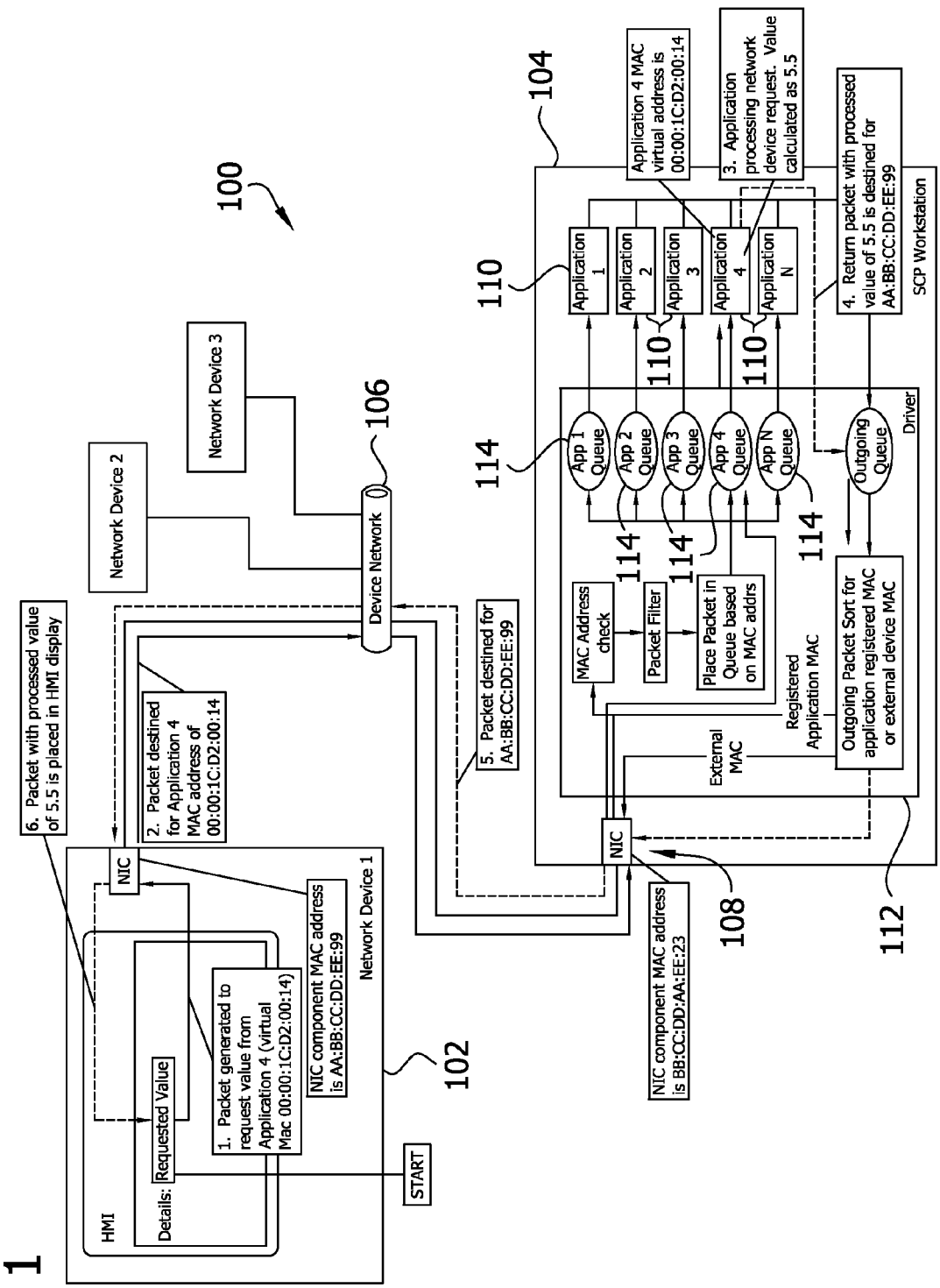
FIG. 1 is a diagram depicting a system incorporating a simulated control processor (SCP) workstation on a device network and showing exemplary steps of a packet exchange between a network device and a simulated control processor application according to an embodiment of the invention.

FIG. 1 shows an exemplary system 100 that incorporates a computer 104 executing a virtual control processor, i.e., a simulation of a distributed control system (DCS) control processor. In addition, the system 100 includes a communication driver 112. A device network 106 is used to connect the computer 104 to an actual process control system network device 102. The computer 104 contains a driver 112 and simulated control processor applications (SCPs) 110. Typically, a computer has a single name and MAC address, but by using the driver 112, multiple SCPs 110 running on the computer 104 are capable of behaving as unique devices with their own names and separate MAC addresses. The driver 112 behaves as an additional networking layer that is responsible for routing messages to and from the appropriate SCPs 110. The computer 104 not only interacts with real process control system elements but is connectable to another simulated process control system network device. In an embodiment, SCP270 available from Invensys Systems, Inc. is suitable simulation software for execution on computer 104.

FIG. 1 also displays the steps of a basic packet exchange between the network device 102 and an SCP 110. The network device 102 generates a packet that is intended for Application 4 in an SCP workstation, i.e., computer 104. While Application 4 is not real, network device 102 interacts with it as if it were because Application 4 has its own unique MAC address and device name. Network device 102 sends the packet on the device network 106 to the SCP workstation 104. The packet goes into the Network Interface Controller (NIC) 108 and is routed to the driver 112. The driver 112 keeps track of all the registered Applications and maintains packet queues 114 for each Application based on their unique MAC addresses. The packet gets routed by the driver 112 to the queue 114 for Application 4. When Application 4 receives the packet from the queue 114, it may reply with its own packet, which it would send along the outgoing path. The driver 112 checks the destination of the packet in the outgoing queue to determine its destination. If the destination were one of the other applications 110 registered with the driver 112, the driver 112 would rout the packet into the proper queue. However, because the packet in the figure is intended for an external MAC address, driver 112 routs the packet back to NIC 108, which routs the packet out to the device network 106. The network device 102 receives the packet from the device network 106 and the packet exchange is completed.

Figure 2:
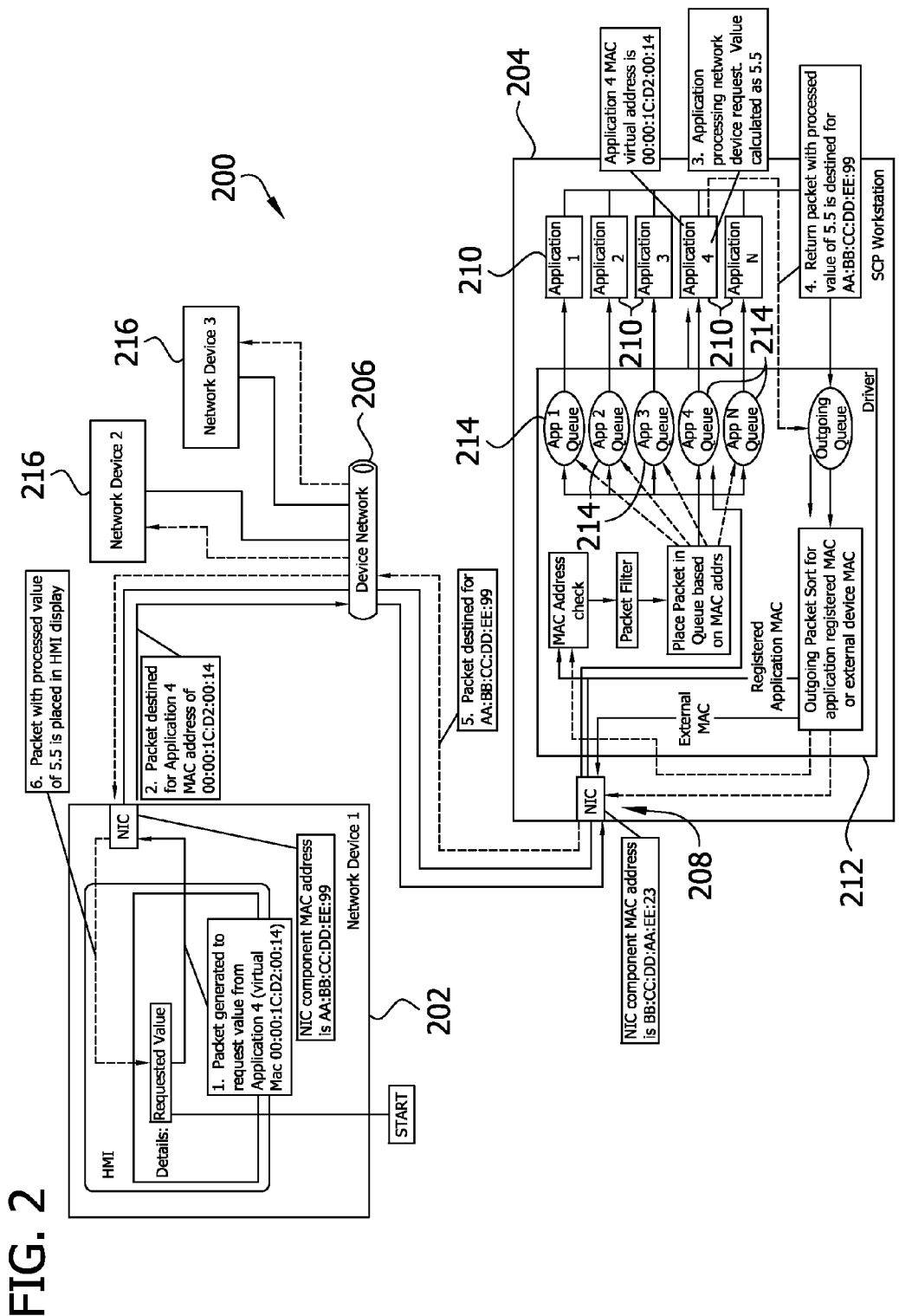
FIG. 2 is a diagram depicting a system incorporating an SCP workstation on a device network and showing exemplary steps of a packet broadcast on the device network by a simulated control processor application according to an embodiment of the invention.

FIG. 2 displays an identical structure, but the packet being sent by an SCP 210, as indicated at Application 4, is a broadcast message intended for all the network devices connected to a device network 206. A network device 202 sends a packet to the device network 206, which routs the packet to an SCP workstation 204. Upon receiving the packet, a driver 212 routs the packet to the correct queue as described above with respect to FIG. 1. In response to the packet, SCP 210 at Application 4 sends out a packet intended for network device 202 as well as network devices 216 connected to device network 206. As a result, driver 212 takes the packet and routs it to a NIC 208 to send it to all the external MAC addresses, and it also routs the packet into each of queues 214 of the applications registered with driver 212.

In both FIG. 1 and FIG. 2, the driver, i.e., driver 112, 212, respectively, or virtual switch, controls the communication of virtual or simulated elements of the process control system. The simulated elements may all be implemented on a single computer along with the driver 112, 212, so the driver interprets incoming and outgoing communications to ensure that they are delivered to the correct element. The simulated elements may simulate the functionality of a control processor (CP) but they are not necessarily limited to CPs and could potentially simulate the functionality of other process control elements.

When SCP 110, 210 starts up, it registers with the respective driver 112, 212 by providing the driver with the SCP name and MAC address. This allows the driver to assign a shared memory segment object for communications between the SCP and the driver. All received and transmitted packets are exchanged using descriptor rings in the shared memory segment. Descriptor rings are the places in memory in which the SCP and driver place packets to be transmitted between the SCP and driver. There are transmit descriptors and receive descriptors for each of the SCPs registered with the driver.

After being registered, SCP 110, 210 initializes the transmit descriptors in the ring, while the respective driver 112, 212 initializes the receive descriptors in the ring. The SCP initially "owns" or controls the transmit descriptors, as they represent the memory to which the SCP will write outgoing messages for the driver to forward. The driver initially "owns" or controls the receive descriptors, as they represent the memory to which the driver will write incoming messages for the SCP to read. In an embodiment, the ownership or control of individual descriptors is achieved by including an OWN bit on each descriptor, where a "0" OWN bit indicates that the descriptor is currently controlled by the SCP process and a "1" OWN bit indicates that the descriptor is currently controlled by the driver. Other methods of indicating ownership of the descriptors may also be used.

During operation, the ownership of a descriptor is changed by its owner to indicate that the other party needs to interact with that descriptor. For instance, if the driver 112, 212 receives a packet intended for SCP 110, 210, it places the packet in a SCP receive descriptor and changes the ownership of the descriptor to the SCP. Then, the SCP determines that the ownership of the receive descriptor has been switched and it takes control of the descriptor and reads the included packet. After obtaining the packet from the descriptor, it changes ownership of the descriptor back to the driver so that the driver may use the descriptor again for a future packet.

To transmit a packet, SCP 110, 210 places the packet to be transmitted into a transmit descriptor which the SCP currently owns. Then, the SCP changes to ownership of the descriptor to the respective driver 112, 212. The driver determines that the ownership of the descriptor had been changed and it reads the packet from the descriptor and sends the packet along to its destination. After the packet has been read from the descriptor, the driver then changes the ownership of the descriptor back to the SCP so that it can be used for future transmit packets.

The SCP 110, 210 can also be unregistered with the driver 112, 212, which would free up the shared memory segment. After unregistering, the SCP is not able to communicate or receive any more packets, as the link with the driver has been removed.

When the driver 112, 212 is started up, it creates a device with the kernel and sets up the driver entry points. When the driver registers with Network Driver Interface Specification (NDIS), it conveys the set of call back functions to be used by NDIS. These call backs are used for passing received messages, environment/status changes, etc. These functions handle different request types coming through the I/O Manager. User applications make library calls which are passed into the kernel via a driver entry point and from there are dispatched to the appropriate subsystem and function.

Memory is virtual in the user space and can be virtual in the kernel space. This means that virtual memory can be paged out, and when needed, paged back in. However, when paged back in, it might not be at the same absolute memory address as when it was paged out. Memory Descriptor Lists (MDLs) allow virtual memory to be referenced. It can then be locked so it remains in physical memory and can be written or read. For the kernel to access the locked virtual memory, a kernel address for it must be obtained. There are kernel functions to allocate an MDL, lock the memory in physical memory so it can be accessed, get a kernel address which maps to the locked physical memory, and release the memory, among other functionality. If kernel memory to be accessed is paged, an MDL must be obtained for it, and the memory must be locked. Dynamic space in the kernel is obtained from kernel pools. These pools can be paged or non-paged. The pools can later be returned or freed as necessary.

In an embodiment, the driver threads can run at various Interrupt Request Levels. The lowest is PASSIVE_LEVEL, where no interrupt vectors are masked. The next higher IRQL levels are for software interrupts. These levels include APC_LEVEL, DISPATCH_LEVEL or, for kernel debugging, WAKE_LEVEL. Device interrupts have still higher IRQL values. The kernel reserves the highest IRQL values for system-critical interrupts, such as those from the system clock or bus errors. Because these higher levels mask interrupts, threads running at these levels cannot access paged memory. Otherwise a "Blue Screen" crash might occur. The shared memory segments used between the driver and the CPs are in paged memory. Thus, any driver thread that accesses them must be running at the PASSIVE_LEVEL. Received packets cause interrupts. Therefore, the threads that get them run at higher levels. These threads cannot place the received packets into the shared memory segment, so they are queued to a thread that is running at the PASSIVE_LEVEL.

Applications can be 32 bit or 64 bit. When making calls into the kernel, the type of application is determined in order to translate any 32 bit addresses to 64 bit. The driver is informed by the I/O Manager whether the calling application is 32 bit or 64 bit via the kernel. Calling parameters are passed to the drivers (e.g., driver 112 or driver 212) in structures. The address pointing to the structure is 64 bit. However, the driver must interpret any addresses in the structure that are 32 bit. Because the 64 bit address occupies 8 bytes in the structure, this has the effect of moving non-address parameters.

In an embodiment, packets are exchanged with NDIS using Net Buffer Lists. These are linked lists. In addition, a Net Buffer List points to a linked list of Net Buffers, which point to MDL chains for the packets to be exchanged. An MDL is obtained for the packet to be transmitted and the MDL chain of the first net buffer is set to this MDL (only 1 Net Buffer is used). Net Buffer Lists are retrieved from a pool that was created during the driver startup. The pool was created such that each Net Buffer List also has a Net Buffer created and associated with it.

A Net Buffer List is "owned" by the entity retrieving it from the pool. When this buffer is passed to NDIS for transmitting packets, the receiving entity returns the buffer when it is done with processing, using the NdisReturnNetBufferLists( ) NDIS function. The owner of the buffer is then informed by NDIS via a call back function, to release the resources. Net Buffer Lists should not be kept from their "owner" for very long, because this ties up resources. As a result, when packets are received, they are copied from the Net Buffer List and then it is returned.

NDIS indicates received packets and events to the driver 112, 212 by using call back functions. These functions are provided to NDIS at startup registration. The driver is bound directly to a lower level Network Interface Controller (NIC) driver, and it is preferably the only thing bound to that NIC. Otherwise, received packets may not be routed correctly to the proper protocol stack. Rather, packets may be routed to the first bound stack. In addition, it is preferably bound to a single NIC.

In an embodiment, when the driver 112, 212 is started, the I/O Manager provides a DRIVER_OBJECT structure that has been allocated for the driver. The driver entry points are set up in an array contained in that DRIVER_OBJECT structure before calling the IoCreateDevice( ) kernel function and comprises:
  A creation function (DriverObject→MajorFunction[IRP_MJ_CREATE]=VSwchOpen;)
  A close function (DriverObject→MajorFunction[IRP_MJ_CLOSE]=VSwchClose;)
  A read function (DriverObject→MajorFunction[IRP_MJ_READ]=VSwchRead;)
  A write function (DriverObject→MajorFunction[IRP_MJ_WRITE]=VSwchWrite;)
  cleanup function (DriverObject→MajorFunction[IRP_MJ_CLEANUP]=VSwchCleanup;)
  A device control function (DriverObject→MajorFunction[IRP_MJ_DEVICE_CONTROL]=VSwchIoControl;)
  A shutdown function (DriverObject→MajorFunction[IRP_MJ_SHUTDOWN]=VSwchShutdown;)
  An unload function (DriverObject→DriverUnload=VSwchUnload;)

In addition a DEVICE_OBJECT structure is returned from the IoCreateDevice( ) kernel function.

In an embodiment, a Device Extension table is added to the DEVICE_OBJECT structure. The Device Extension table contains information used in interactions with NDIS.

When registering with NDIS, the following call back functions are provided in an NDIS_PROTOCOL_DRIVER_CHARACTERISTICS structure:
  ProtocolChar.OpenAdapterCompleteHandlerEx is called by NDIS to complete the processing of an bind request initiated by the driver for which the returned status was NDIS_STATUS_PENDING.
  ProtocolChar.CloseAdapterCompleteHandlerEx is called by NDIS when the lower adapter has been unbound.
  ProtocolChar.SendNetBufferListsCompleteHandler is called by NDIS to complete the processing of a send request. This results from the lower miniport calling NDIS to indicate it has processed the send.
  ProtocolChar.OidRequestCompleteHandler is called by NDIS to complete the processing of an OID request initiated by the driver for which the returned status was NDIS_STATUS_PENDING.
  ProtocolChar.ReceiveNetBufferListsHandler is called by NDIS when a packet has been received.
  ProtocolChar.StatusHandlerEx is called by NDIS when a status has changed.
  ProtocolChar.BindAdapterHandlerEx is called by NDIS to bind to a lower miniport adapter.
  ProtocolChar.UnbindAdapterHandlerEx is called by NDIS to unbind with a lower miniport adapter.
  ProtocolChar.NetPnPEventHandler is called by NDIS for a Plug-and-Play event.

To bind with the NIC, NDIS calls the ProtocolBindAdapterEx call back function. This function does the following:
  Initialize the Net Buffer List pool parameters.
  Allocate a Net buffer List pool for received packets, using NdisAllocatNetBufferListPool( ) NDIS function.
  Allocate Net Buffer Lists from that pool, using NdisAllocateNetBufferList( ) NDIS function and insert these into a linked list.
  Allocate a Net buffer List pool for transmitted packets, using NdisAllocatNetBufferListPool( ) NDIS function.
  Allocate Net Buffer Lists from that pool, using NdisAllocateNetBufferList( ) NDIS function and insert these into a linked list.
  Allocate memory from a non-paged pool for NDIS counter request and NDIS counter value.
  Get the device object of the lower miniport and open the adapter with the NdisOpenAdapterEx( ) NDIS function.
  If the device is pending open, then sleep, waiting for the ProtocolOpenAdapterCompleteEx( ) to call back to wake the function, indicating the bind is complete.

After this callback returns, the binding is in the Opening state. If the return is successful, the opening is complete and the binding goes to the Paused state. On the receipt of a PnP Restart event, the binding goes to the Restarting state. When the Plug N Play (PnP) event handler (handled in the ProtocolNetPnPEvent call back function) does a successful return, the binding goes to the Running state and is operational.

The driver binding states are:
  Unbound—This is the initial state of the binding. In this state, the protocol driver waits for NDIS to call the ProtocolBindAdapterEx function.
  Opening—In this state, the protocol driver allocates resources for the binding and attempts to open the adapter.
  Running—In this state, the protocol driver performs send and receive processing.
  Closing—In this state, the protocol driver closes the binding to the adapter and then releases the resources for the binding.
  Pausing—In this state, the protocol driver completes any operations that are required to stop send and receive operations. This state is entered upon a PnP Pause event. When the even handler returns successful, the state goes to Paused.

Paused—In this state, the protocol driver does not perform send or receive operations.

Restarting—In this state, the protocol driver completes any operations that are required to restart send and receive operations. This state is entered upon a PnP Restart event. When the event handler returns successfully, the state goes to Running.

Plug N Play events are handled by the ProtocolNetPnPEvent( ) call back function. This function handles the following events:

NetEventSetPower
NetEventQueryPower
NetEventQueryRemoveDevice
NetEventCancelRemoveDevice
NetEventReconfigure
NetEventBindsComplete
NetEventPause
NetEventRestart
NetEventPnPCapabilities
NetEventBindList
NetEventPortDeactivation User calls to the driver 112, 212 are done using calls handled by the I/O Manager. The interface must be opened first, before invoking kernel functions. Open calls are directed to the VSwchOpen( ) function in vsdrvr_disp.c. The first time this is called, nt_mac_init( ) is called. This function:

Initializes the close queue counters.
Initializes the receive, close, and transmit queues and their spinlocks.
Initializes a fast mutex for transmits.
Initializes receive and transmit thread events.
Creates a receive thread and a transmit thread.
Creates a transmit poll thread.
Waits for the receive and transmit threads to initialize.
Checks NIC binding and wait if not complete.
Enables packet receiving in promiscuous mode from the lower layer.

After the driver interface is opened, user requests come through the VSwchIoControl( ) function in vsdrvr_disp.c. The request parameters are packaged in an Integrated Routing Protocol (IRP) by the I/O Manager. The IRP contains the stack location for the parameters, as a 64 bit address. The stack contains the IO Control Code, which has the subsystem and the transfer type, and a 64 bit pointer system buffer containing the user arguments. The transfer type is METHOD_BUFFERED. The user arguments are contained in a structure that contains a pointer to the parameters, the length of the parameters, the command, a pointer to the user's results storage, and local results storage. If coming from a 32 bit user application, these pointers are 32 bit and need to be converted to 64 bit.

The VSwchIoControl( ) function calls the vfox_ioctl( ) function to dispatch to the appropriate subsystem. Vfox_ioctl( ) gets an MDL and locks the memory for the parameter block before dispatching to the subsystem. The command and length of the parameters are also passed to the subsystem. When the subsystem call returns, the return value is copied back to the user's results storage and the parameter block is unlocked and the MDL freed.

Messages to be sent are placed in a transmit descriptor in the shared memory segment. The XmtPollThread( ) function polls the transmit descriptors and delivers the messages to mac_send( ) for transmission. mac_send( ) gets a Net Buffer List and associates the message to be sent with the Net Buffer List before passing it to NDIS for transmission.

A layer that gets and sets up a Net Buffer List "owns" it. When a Net Buffer List is given to NDIS to deliver to the next lower layer for sending, the lower layer will make an NDIS call when it is finished processing it. NDIS will then call back the ProtocolSendNetBufferListsComplete( ) function, returning the Net Buffer List to its "owner" which can then release the Net Buffer List and associated resources.

Received packets are sent to the driver from NDIS via the ProtocolReceiveNetBufferLists( ) call back function. The packet is extracted from the MDL using the NdisQueryMdl( ) NDIS call. The packet is then added to a queue to the receive thread. If the receive queue was empty before this latest packet, the receive thread is activated.

The receive thread extracts the packet and its size and passes them to locally registered control processors (CPs) via the RoutePkt( ) call. That function determines if it is a multicast, unicast, or an invalid packet (which are dropped). Multicasts are passed to the receive descriptors of all registered CPs. Unicasts are passed directly to the destination registered CP. If the destination is not a registered CP, the packet is dropped.

Embodiments of the invention, as described above, preferably use a kernel device driver on a WINDOWS® operating system available from Microsoft Corporation. It is to be understood that implementations on other operating or hardware platforms are contemplated. For example, even if an alternative embodiment does not offer the specific Interrupt Request Levels described above, the principles remain the same and such alternatives do not deviate from the present invention.

In operation according to a preferred embodiment of the present invention, the virtual switch(es) connects multiple physical (hardware) control processors with multiple instances of computer 104, 204. Each computer 104, 204 has one virtual switch/driver 112, and multiple instances of application/SCP 110. It is to be understood that multiple elements of a process control system are able to connect to multiple simulated elements without deviating from the present invention.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A system for enabling communication between physical and simulated elements of an industrial process control and automation system comprising:
    a processor;
    a network interface having a first network address;
    a memory device coupled to the processor; and
    instructions stored on the memory device and executable by the processor, wherein said instructions, when executed by the processor, form a virtual switch having a plurality of behaviors comprising:
        conveying one or more call back functions to be used by a network driver interface specification (NDIS) of the network interface to register the system with the NDIS;
        connecting to a first element via the network interface, said first element being a physical element of an industrial process control and automation system, and said first element having a second network address, wherein the second network address is different from the first network address;
        connecting to a second element, said second element being a simulated element simulating the functionality of a physical element of the industrial process control and automation system, and said second element having a third network address, wherein the third network address is different from the first network address and the second network address;
        receiving, via the network interface, a first communication from the first element intended for the third network address and sending, via the one or more call back functions, the first communication to the second element; and
        receiving a second communication from the second element intended for the second network address and sending the second communication to the first element via the network interface.

2. The system of claim 1, wherein the second element is a simulated control processor of the industrial process control and automation system.

3. The system of claim 1, wherein the third network address comprises a MAC address, and wherein the second element provides the MAC address to the virtual switch when connected to the virtual switch.

4. The system of claim 1, wherein the virtual switch behaviors further comprise assigning a shared memory segment for communication between the second element and the virtual switch.

5. The system of claim 4, wherein the shared memory segment contains a plurality of descriptors, said descriptors comprising memory locations where communication information is placed.

6. The system of claim 5, wherein a first descriptor of the plurality of descriptors comprises an indicator, said indicator indicating one of the second element and the virtual switch currently controls the first descriptor currently.

7. The system of claim 6, wherein the indicator indicates that the second element controls the first descriptor and the second element changes the indicator to indicate that the virtual switch controls the first descriptor.

8. The system of claim 6, wherein the indicator indicates that the virtual switch controls the first descriptor and the virtual switch changes the indicator to indicate that the second element controls the first descriptor.

9. The system of claim 4, wherein the second element writes communication data to the shared memory segment and the virtual switch reads the communication data from the shared memory switch.

10. The system of claim 4, wherein the virtual switch writes communication data to the shared memory segment and the second element reads the communication data from the shared memory segment.

11. The system of claim 1, wherein the virtual switch behaviors further comprise:
storing the first communication in a queue in the memory device assigned specifically for the second element; and
storing the second communication in an outgoing queue in the memory device shared among the second element and at least one other simulated element simulating the functionality of another physical element of the industrial process control and automation system.

12. The system of claim 1, the plurality of behaviors further comprising:
connecting to a third element, the third element being a simulated element simulating the functionality of a physical element of the industrial process control and automation system, and said third element having a fourth network address, wherein the fourth network address is different from the first network address, the second network address, and the third network address;
receiving a third communication from the third element intended for the second network address and sending the third communication to the first element via the network interface; and
receiving, via the network interface, a fourth communication from the first element intended for the fourth network address and sending the fourth communication to the third element.

13. The system of claim 12, the plurality of behaviors further comprising receiving, via the network interface, a fifth communication from the first element intended for the third and fourth network addresses and sending the fifth communication to the second and third elements.

14. A processor executable method for enabling communication between physical and simulated elements of an industrial process control and automation system comprising:
registering a driver with a network driver interface specification (NDIS) by conveying one or more call back functions to be used by the NDIS for passing received messages;
connecting to at least one physical element of an industrial process control and automation system through a network interface card having a first media access control (MAC) address, said physical element having a second MAC address, wherein the first and second MAC addresses are different;
connecting to at least one simulated element of the industrial process control and automation system, said simulated element having a third MAC address, wherein the third MAC address is different from the first and second MAC addresses;
receiving a first communication through the network interface card from the physical element intended for the third MAC address and sending the first communication to the simulated element through the one or more call back functions; and
receiving a second communication from the simulated element intended for the second MAC address and sending the second communication to the physical element through the network interface card.

15. The method of claim 14, wherein the simulated element simulates the functionality of a physical control processor of the industrial process control and automation system.

16. The method of claim 14, further comprising:
connecting to a second simulated element of the industrial process control and automation system, said second simulated element having a fourth MAC address, wherein the fourth MAC address is different from the first, second, and third MAC addresses;
receiving a third communication from the second simulated element intended for the second MAC address and sending the third communication to the physical element through the network interface card; and
receiving a fourth communication through the network interface card from the physical element intended for the fourth MAC address and sending the fourth communication to the second simulated element.

17. The method of claim 16, further comprising receiving a fifth communication through the network interface card from the physical element intended for the third MAC address and the fourth MAC address and sending the fifth communication to the simulated element and the second simulated element.

18. One or more tangible, non-transitory computer-readable media having executable instructions stored thereon that, when executed, perform a method for enabling communication between physical and simulated elements of an industrial process control and automation system comprising:
registering with a network driver interface specification (NDIS) of a network interface, wherein registering comprises conveying one or more call back functions to be used by the NDIS for passing received messages;
connecting to a first element via the network interface having a first network address, said first element being a physical element of an industrial process control and automation system, and said first element having a second network address, wherein the first and second network addresses are different;
connecting to a second element, said second element being a simulated element simulating the functionality of a physical element of the industrial process control and automation system, and said second element having a third network address, wherein the third network address is different from the first network address and the second network address;

receiving, via the network interface, a first communication from the first element intended for the third network address and sending, via the one or more call back functions, the first communication to the second element; and receiving a second communication from the second element intended for the second network address and sending the second communication to the first element via the network interface.

19. The computer-readable media of claim 18, the executable instructions further comprising instructions performing:

connecting to a third element, the third element being a simulated element simulating the functionality of a physical element of the industrial process control and automation system, and said third element having a fourth network address, wherein the fourth network address is different from the first network address, the second network address, and the third network address;

receiving a third communication from the third element intended for the second network address and sending the third communication to the first element via the network interface; and receiving, via the network interface, a fourth communication from the first element intended for the fourth network address and sending the fourth communication to the third element.

20. The computer-readable media of claim 19, the executable instructions further comprising instructions performing receiving, via the network interface, a fifth communication from the first element intended for the third and fourth network addresses and sending the fifth communication to the second and third elements.

* * * * *